(12) United States Patent
D'Anzi (10) Patent No.: US 9,685,668 B2
(45) Date of Patent: Jun. 20, 2017

(54) FLOW BATTERY (71) Applicant: PROXHIMA S.R.L., Bologna (IT)

(72) Inventor: Angelo D'Anzi, Medicina (IT)

(73) Assignee: PROXHIMA S.R.L., Bologna (IT)

( * ) Notice: Subject to any disclaimer, the term of this patent is extended or adjusted under 35 U.S.C. 154(b) by 0 days.

(21) Appl. No.: 14/901,002

(22) PCT Filed: Jun. 23, 2014

(86) PCT No.: PCT/EP2014/063183
§ 371 (c)(1),
(2) Date: Dec. 22, 2015

(87) PCT Pub. No.: WO2014/206942
PCT Pub. Date: Dec. 31, 2014

(65) Prior Publication Data
US 2016/0149236 A1   May 26, 2016

(30) Foreign Application Priority Data

Jun. 25, 2013 (IT) .............................. BO2013A0327

(51) Int. Cl.
*H01M 8/18*   (2006.01)
*H01M 8/04082*   (2016.01)
(Continued)

(52) U.S. Cl.
CPC ....... *H01M 8/04201* (2013.01); *H01M 8/188* (2013.01); *H01M 8/20* (2013.01); *H01M 10/4214* (2013.01); *Y02E 60/528* (2013.01)

(58) Field of Classification Search
CPC ............. H01M 8/04201; H01M 8/188; H01M 10/4214; H01M 8/20; Y02E 60/528
See application file for complete search history.

(56) References Cited

U.S. PATENT DOCUMENTS 6,692,862 B1 *  2/2004  Zocchi ............... H01M 8/04119
                                                      429/101
2009/0047570 A1  2/2009  Harper
(Continued)

FOREIGN PATENT DOCUMENTS

WO   WO 2011/137895 A2   11/2011
WO   WO 2012/083239 A1   6/2012

OTHER PUBLICATIONS

International Search Report (PCT/ISA/210) for PCT/EP2014/063183 mailed Sep. 4, 2014.
Italian Search Report for IT BO20130327 dated Mar. 20, 2014.

*Primary Examiner* — Stewart Fraser
(74) *Attorney, Agent, or Firm* — Koppel, Patrick, Heybl & Philpott (57) ABSTRACT

A flow battery comprising a first tank for an anode electrolyte, a second tank for a cathode electrolyte, respective hydraulic circuits provided with corresponding pumps for supplying electrolytes to specific planar cells, provided with channels on the two mutually opposite faces for the independent conveyance of the electrolytes, mutually separated by electrolytic membranes and electrodes, the planar cells constituting a laminar pack, on at least one front of the laminar pack there being an end plate provided, on a first face, with at least one channel for the access of the electrolytes that arrive from the laminar pack, with at least one discharge channel for the conveyance of the electrolytes that originate from the access channel to at least one outlet that is connected to a respective tank, and at least one mixing channel.

10 Claims, 4 Drawing Sheets

(51) Int. Cl.
*H01M 8/20* (2006.01)
*H01M 10/42* (2006.01)

(56) References Cited

U.S. PATENT DOCUMENTS

| | | | |
|---|---|---|---|
| 2011/0311896 A1 | 12/2011 | Harper | |
| 2015/0221959 A1* | 8/2015 | Jin | H01M 8/0258 |
| | | | 429/418 |
| 2015/0325874 A1* | 11/2015 | Spaziante | H01M 8/04955 |
| | | | 429/418 |

* cited by examiner

FLOW BATTERY

The present invention relates to a flow battery.

A flow battery is a type of rechargeable battery in which electrolytes that contain one or more dissolved electroactive substances flow through an electrochemical cell, which converts the chemical energy directly into electric energy. The electrolytes are stored in adapted external tanks and are pumped through the cells of the reactor.

Redox flow batteries have the advantage of having a flexible layout (due to the separation of the power components and of the energy components), a long life cycle, rapid response times, no need to smooth the charge and no harmful emissions.

Flow batteries are used for stationary applications with an energy demand between 1 kWh and several MWh: they are used to smooth the load of the grid, where the battery is used to accumulate during the night energy at low cost and return it to the grid when it is more expensive, but also to accumulate power from renewable sources such as solar energy and wind power, to then provide it during peak periods of energy demand.

In particular, a vanadium Redox battery consists of a set of electrochemical cells in which the two electrolytes are separated by a proton exchange membrane. Both electrolytes are based on vanadium: the electrolyte in the positive half-cell contains $VO_2^+$ and $VO^{2+}$ ions while the electrolyte in the negative half-cell contains $V^{3+}$ and $V^{2+}$ ions. The electrolytes can be prepared in several ways, for example by electrolytic dissolution of vanadium pentoxide ($V_2O_5$) in sulfuric acid ($H_2SO_4$). The solution that is used remains strongly acidic. In vanadium flow batteries the two half-cells are furthermore connected to storage tanks that contain a very large volume of electrolyte, which is made to circulate through the cell by means of adapted pumps. Such circulation of liquid electrolytes requires a certain space occupation and limits the possibility to use vanadium flow batteries in mobile applications, in practice confining them to large fixed installations.

While the battery is being charged, in the positive half-cell the vanadium is oxidized, converting $VO_2^+$ into $VO^{2+}$. The removed electrons are transferred to the negative half-cell, where they reduce the vanadium from $V^{3+}$ to $V^{2+}$. During use, the process occurs in reverse and one obtains a potential difference of 1.41 V at 25° C. in an open circuit.

The vanadium Redox battery is the only battery that accumulates electric energy in the electrolyte and not on the plates or electrodes, as occurs commonly in all other battery technologies.

Differently from all other batteries, in the vanadium Redox battery the electrolyte contained in the tanks, once charged, is not subjected to auto-discharge, while the portion of electrolyte that is stationary within the electrochemical cell is subject to auto-discharge over time.

The quantity of electric energy stored in the battery is determined by the volume of electrolyte contained in the tanks.

According to a particularly efficient specific constructive solution, a vanadium Redox battery consists of a set of electrochemical cells within which the two electrolytes, mutually separated by a polymeric electrolyte, flow. Both electrolytes are constituted by an acidic solution of dissolved vanadium. The positive electrolyte contains $V^{5+}$ and $V^{4+}$ ions, while the negative one contains $V^{2+}$ and $V^{3+}$ ions. While the battery is being charged, in the positive half-cell the vanadium oxidizes, while in the negatives half-cell the vanadium is reduced. During the discharge step, the process is reversed. The connection of multiple cells in an electrical series allows to increase the voltage across the battery, which is equal to the number of cells multiplied by 1.41 V.

During the charging step, in order to store energy, the pumps are turned on, making the electrolyte flow within the electrochemical cell. The electric energy applied to the electrochemical cell facilitates proton exchange by means of the membrane, charging the battery.

During the discharge step, the pumps are turned on, making the electrolyte flow inside the electrochemical cell, thus releasing the accumulated energy.

During the operation of the battery there is a migration of electrolyte from one compartment to the other of the group of cells that constitute it (known as stack), facilitated by the electromotive force of the process. This causes a change in the levels of the tanks, where one level rises and the other one lowers.

The levels of both compartments are usually monitored respectively by a minimum-level probe and by a maximum-level probe. The probe is constituted by two electrodes at a known distance, which are provided by a nickel-chromium wire immersed in the liquid. As the level varies, so does the resistance between the two electrodes. At one of these limiting levels it is necessary to interrupt the operation of the battery and restore the levels of the two tanks (i.e., emptying the excessively full one and filling the excessively empty one).

Such operation is performed usually thanks to the presence of pipes that are external to the battery and are specifically dedicated. Obviously, such pipes cause an increase in the overall cost of said battery and a greater structural complexity thereof. It should also be specified that such pipes, being subject to infrequent use, can be subject to ruptures and/or malfunctions.

When the battery is in operation for a long period, the imbalance of the levels, although restored periodically by the leveling function, leads to an imbalance in the concentrations of the vanadium species that compose it. It is therefore necessary, at a predefined periodic rate, to mix both of the electrolytes so as to have the assurance that there is an equal quantity of vanadium on the anode and on the cathode. It is evident that the mixing of the two electrolytes brings the state of the battery to a point where it does not work and where the read voltage is equal to zero (there is no difference in electric potential across the battery), since both compartments contain vanadium at the oxidation state of 3.5. To return to a discharged battery state, where one has $V^{3+}$ and $V^{4+}$ (so that as a consequence of a subsequent recharging one can obtain the condition in which the positive electrolyte contains $V^{5+}$ and $V^{4+}$ ions while the negative electrolyte contains $V^{2+}$ and $V^{3+}$ ions) there is an energy expenditure that is equal to a half charge and is necessary to condition each electrolyte. Only after conditioning is it possible to recharge.

To perform this electrolyte mixing operation, too, it is necessary to have adapted hydraulic circuits that mutually couple the intakes and the outlets of the tanks in order to allow the correct mixing of the electrolytes contained therein.

In a manner similar to what has been described for the leveling procedure, in this case also the auxiliary hydraulic circuits increase the overall cost of the battery.

Since they are subject to an even more limited use than that provided for the leveling pipes, the hydraulic mixing circuits also can be subject to malfunctions caused indeed by limited use.

The aim of the present invention is to solve the problems described above, devising a flow battery that comprises a small number of hydraulic circuits and external pipes and therefore is less expensive than batteries of the known type and is scarcely subject to failures and malfunctions.

Within this aim, an object of the invention is to propose a flow battery in which the operations for mixing and leveling the electrolytes are particular simple, quick and efficient.

A further object of the present invention is to provide a flow battery that has low costs, is relatively simple to provide in practice and is safe in application.

This aim and these and other objects that will become more apparent hereinafter, are achieved by a flow battery of the type comprising a first tank for an anode electrolyte, a second tank for a cathode electrolyte, respective hydraulic circuits provided with corresponding pumps for supplying electrolytes to specific planar cells, provided with channels on the two mutually opposite faces for the independent conveyance of said electrolytes, mutually separated by electrolytic membranes and electrodes, characterized in that said planar cells are mutually aligned and arranged side-by-side so as to constitute a laminar pack, on at least one front of said laminar pack there being an end plate provided, on a first face, with at least one channel for the access of the electrolytes that arrive from said laminar pack, with at least one discharge channel for the conveyance of the electrolytes that originate from said access channel to at least one outlet that is connected to a respective tank, and at least one mixing channel that is connected to said at least one outlet, said plate being provided, on a second face, with a cavity to the bottom of which the at least one said access channel, the at least one said discharge channel and the at least one said mixing channel lead, said cavity accommodating a respective valve provided with at least one duct for the selective connection of said at least one access channel either to the at least one said discharge channel or to the at least one said mixing channel.

Further characteristics and advantages of the invention will become better apparent from the description of a preferred but not exclusive embodiment of the flow battery according to the invention, illustrated by way of nonlimiting example in the accompanying drawings, wherein.

Figure 1:
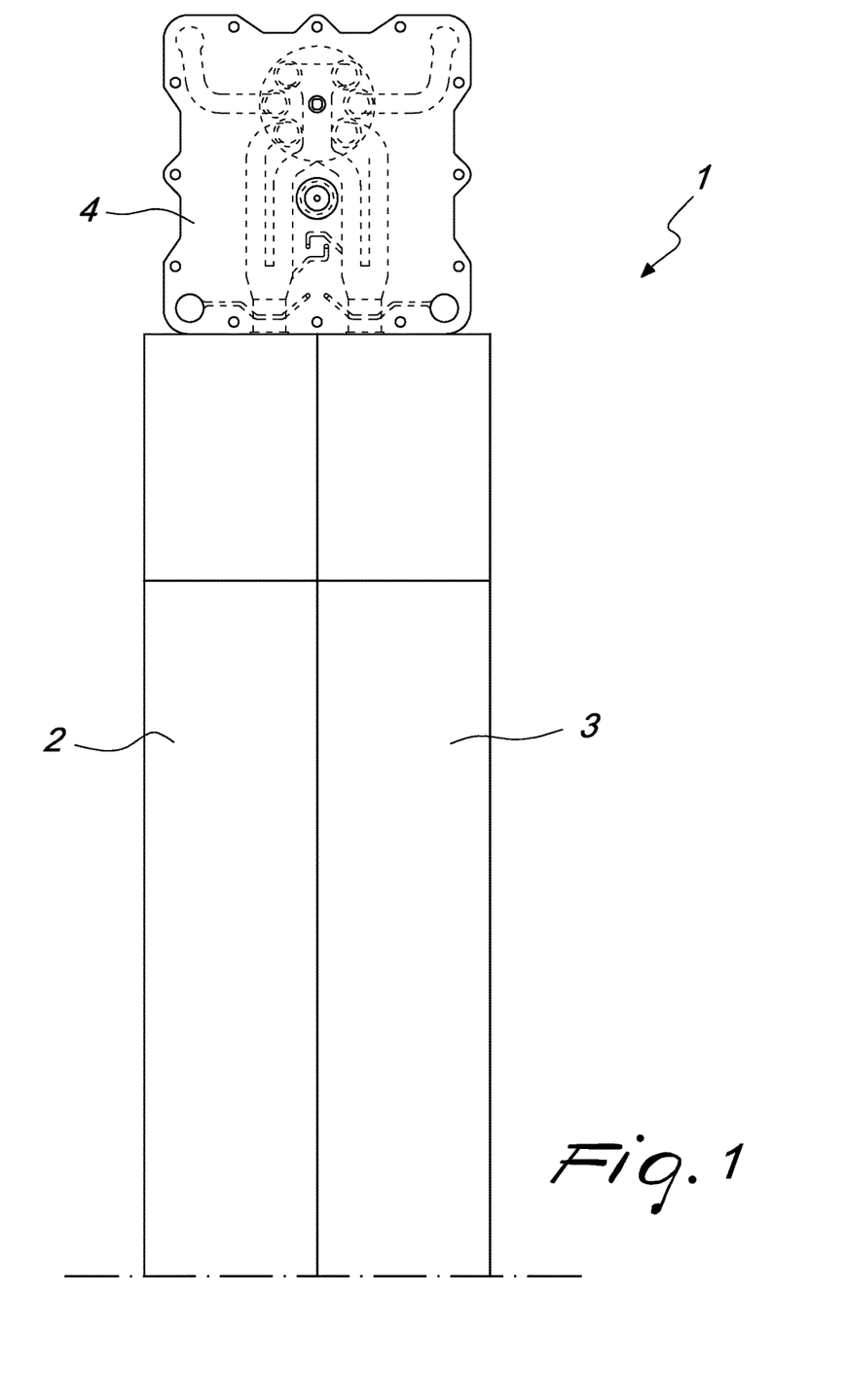
FIG. 1 is a schematic front view of a flow battery according to the invention.

With particular reference to the figures cited above, the reference numeral 1 designates generally a flow battery according to the invention. The flow battery 1 comprises a first tank 2 for an anode electrolyte, a second tank 3 for a cathode electrolyte, respective hydraulic circuits provided with corresponding pumps for the supply of electrolytes to specific planar cells, provided with channels on the two mutually opposite faces for the independent conveyance of the electrolytes, said cells being mutually separated by electrolytic membranes and electrodes.

The planar cells of the battery 1 are mutually aligned and laterally adjacent so as to constitute a laminar pack.

An end plate 4 is arranged on at least one front of said laminar pack.

Figures 4, 5:
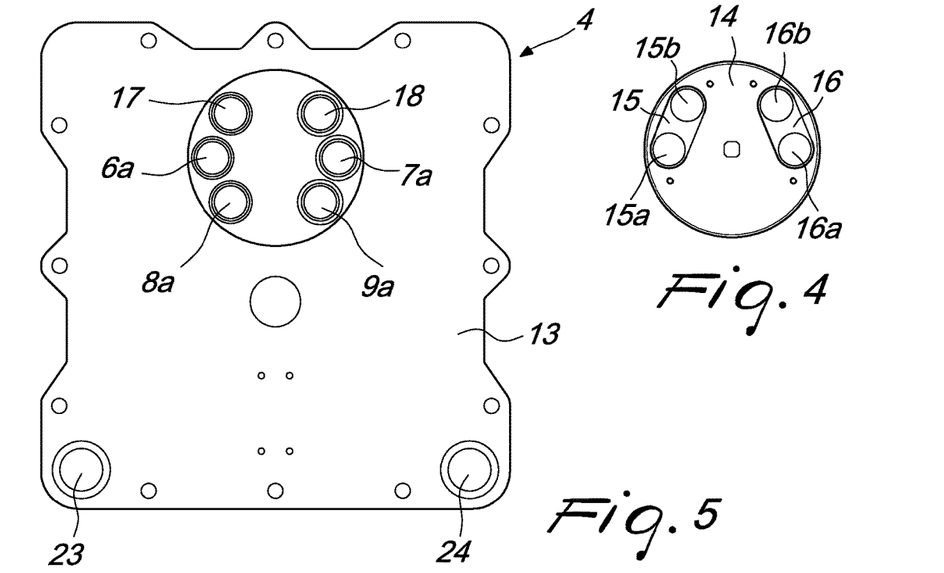
FIG. 4 is a schematic front view of a valve of the end plate of FIG. 2.
FIG. 5 is a front view of the end plate of FIG. 2.

The end plate 4 is provided, on a first face 5 thereof, with at least one access channel 6 and 7 of the electrolytes that arrive from the laminar pack (i.e., the ones that have already taken part in the chemical reaction and must return to the tanks 2 and 3), at least one discharge channel 8 and 9 for the conveyance of the electrolytes that arrive from the at least one access channel 6 and 7 to at least one outlet 10 and 11, which is connected to a respective tank 2 and 3, and at least one mixing channel 12, also connected to the at least one outlet 10 and 11.

By means of the outlet 10 and 11, the electrolytes can flow out into the respective storage tanks 2 and 3.

Figure 2:
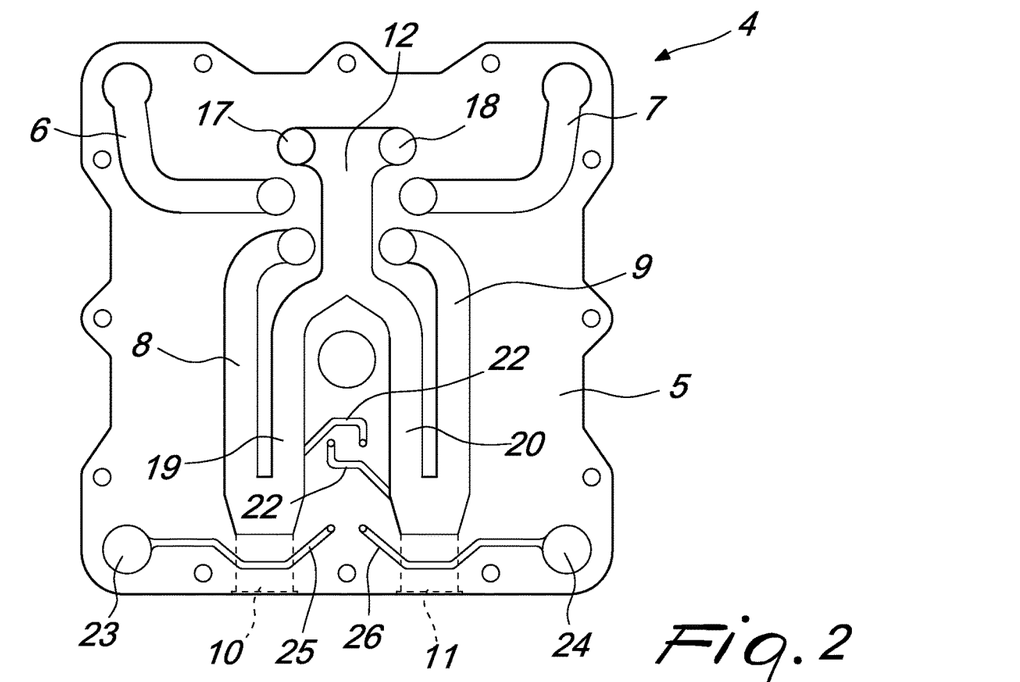
FIG. 2 is a schematic rear view of an end plate of a flow battery according to the invention.
Figure 3:
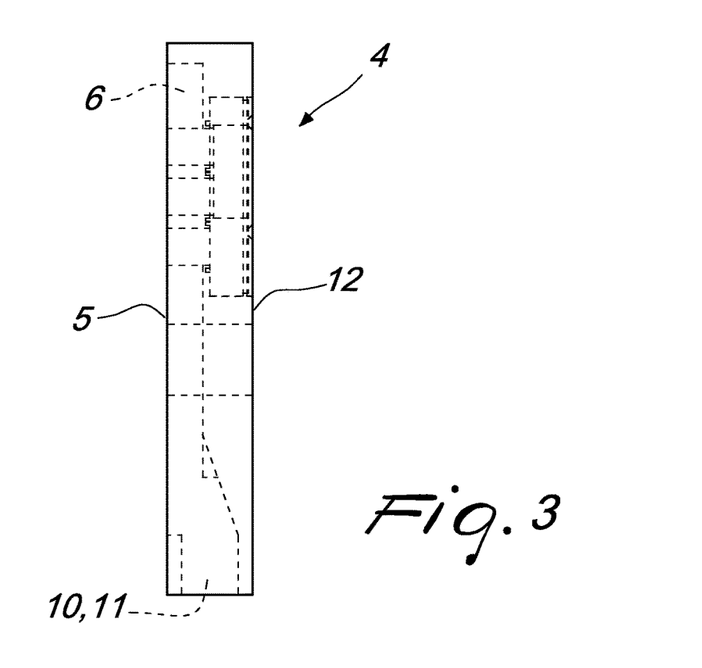
FIG. 3 is a schematic front sectional view of the end plate of FIG. 2.

The plate 4, moreover, is provided on a second face 13 thereof with a cavity to the bottom of which the at least one access channel 6 and 7, the at least one discharge channel 8 and 9 and the at least one mixing channel 12 lead.

According to the invention, the cavity is intended to accommodate a respective valve 14 provided with at least one duct 15 and 16 for the selective connection of the at least one access channel 6 and 7 to one between the at least one discharge channel 8 and 9 and the at least one mixing channel 12.

It is deemed appropriate to specify that according to a constructive solution that is particularly interesting from a constructive standpoint, the cavity has a substantially disc-like shape and is provided, on its bottom, with at least one hole that corresponds to at least one opening selected between the terminal end 6a and 7a of the at least one access channel 6 and 7, the initial end 8a and 9a of the at least one discharge channel 8 and 9, and the initial end 17 and 18 of the at least one mixing channel 12.

With particular reference to the constructive solution described earlier, the valve 14 has a shape and dimensions that are complementary to those of the described cavity, so that it can be accommodated rotatably and hermetically within said cavity.

The valve 14 comprises at least one duct 15, 16, which is substantially U-shaped and has at least one intake passage 15a and 16a and at least one exit passage 15b and 16b, which face each other and are proximate to at least one respective opening selected among the terminal end of the at least one access channel 6 and 7, the initial end of the at least one discharge channel 8 9, and the initial end of the at least one mixing channel 12 that are present on the bottom of the cavity.

It is specified that within the scope of a constructive solution of unquestionable interest in practice and in application, the access channels 6 and 7 are preferably two in number and so are the discharge channels 8 and 9.

In this case, the channels 6, 7, 8 and 9 are arranged symmetrically with respect to the centerline of the end plate 4.

Again with reference to such constructive solution, the mixing channel 12 has an initial end that is constituted by two passage ports 17 and 18 and a terminal bifurcation, the branches 19 and 20 of which converge into the two outlets 10 and 11 of said plate 4 (outlets 10 and 11 into which the discharge channels 8 and 9 also converge).

Figure 6:
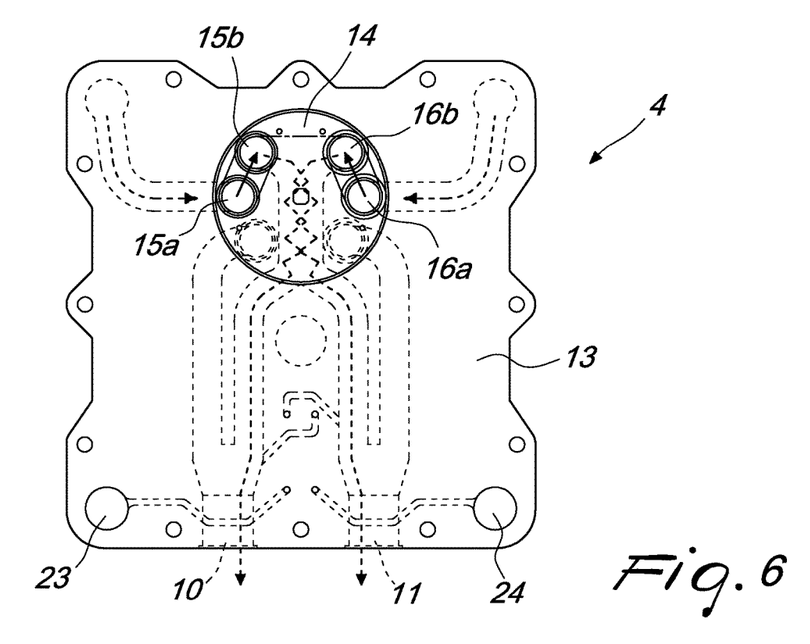
FIG. 6 is a schematic front view of the end plate of FIG. 2 in a first operating configuration.
Figure 7:
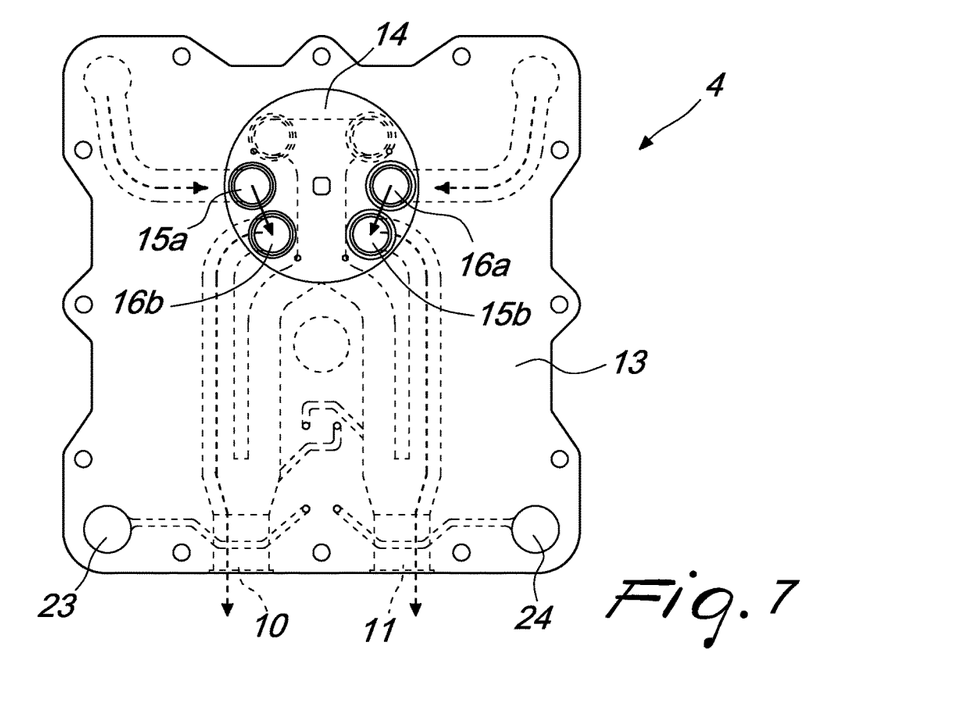
FIG. 7 is a schematic front view of the end plate of FIG. 2 in a second operating configuration.

It is specified furthermore that the valve 14 can move from a first configuration, in which its intake passages 15a and 16a are connected hydraulically to a respective terminal end of the at least one access channel 6 and 7 and its exit passages 15b and 16b are connected hydraulically to a respective initial end of the at least one discharge channel 8 and 9, to a second configuration, in which its intake passages 15a and 16a are connected hydraulically to a respective terminal end of the at least one access channel 6 and 7 and its exit passages 15b and 16b are connected hydraulically to a respective passage port 17 and 18 of the mixing channel 12.

It is specified furthermore that the branches 19 and 20 of the mixing channel 12 can comprise respective shunts 21 and 22 that are open outwardly for coupling to a corresponding sensor (not visible in the accompanying figures), which is external to the laminar pack, in order to detect a value selected among electrolyte pressure, differential pressure of the electrolytes in the two branches 19 and 20, flow-rate of the electrolyte, relative flow-rates of the electrolytes in the two branches 19 and 20, temperature of the electrolyte, differential temperature of the electrolytes in the two branches 19 and 20, and the like.

In particular, the shunts 21 and 22 are connected to a so-called sensing cell, i.e., a device by means of which the potential of the battery 1 is measured outside the electrical field to which the laminar pack is subjected. By way of such sensing cell, the actual charge state of the battery is measured.

From a constructive standpoint, it is necessary to show that the end plate 4 comprises two through channels 23 and 24 for introducing the electrolytes in the laminar pack.

According to this constructive solution, the through channels 23 and 24 comprise respective shunts 25 and 26 that are open outwardly for coupling to a corresponding sensor (also not visible in the accompanying figures), which is external to the laminar pack, in order to detect a value selected among electrolyte pressure, differential pressure of the electrolytes in the two channels 23 and 24, flow-rate of electrolyte, relative flow-rates of the electrolytes in the two channels 23 and 24, temperature of the electrolyte, differential temperature of the electrolytes in the two channels 23 and 24, and the like.

The shunts 25 and 26 also are connected, in the constructive solution of true practical interest, to a respective sensing cell.

It is deemed necessary to specify that the laminar pack and the end plate 4 are arranged on the top of an enclosure that contains the tanks 2 and 3: this causes a vertical extension of the battery 1, with consequent minimum transverse space occupation.

The battery 1 operates in a passive manner: the decision related to charging or discharging is managed by the user, who, as a function of its specific application, has available a controller which, by way of a corresponding communications protocol, manages the battery 1 within its specifications.

Therefore, the battery 1, in standby, shows on a respective user interface display the status and the values and, as a function of the operating mode, selected among maintenance, external grid or auxiliary battery, merely remains ready for use. If an "external grid" function is selected, in order to be able to activate the battery 1 the central controller must send the pump start command by means of the communication protocol.

A protection relay removes the power supply in case of alarm or if limits of depth of discharge (DOD) and fullness of charge (FOC) have been reached.

An internal climate control unit is installed which maintains the temperature of the battery 1 within the interval comprised between 0° C. and 50° C.

If one wishes to connect several batteries in series, each battery 1 receives instruction by means of the communication protocol and displays on the line its data so that the user can monitor the status of each individual battery 1.

The battery 1 has two different functions, which depend on the type of installation. The functions are: "hold", "external grid", and "auxiliary battery".

The "hold" function is activated when the battery 1 is connected in a stand-alone configuration, wherein the battery 1 must utilize its own energy in order to remain operational. In this case, the system monitors the voltage across the lamination pack and as soon as it drops below a set value it causes the activation of the pumps to restore the original voltage.

The "external grid" function is activated when the battery is permanently connected to an electrical grid, which supplies power to the system.

The "auxiliary battery" function is required when the battery 1 is connected in a stand-alone configuration but one wishes to preserve as long as possible the energy contained in the main battery 1. Such standalone mode with auxiliary battery ensures a better efficiency of the system.

The battery starts if one of the following conditions occurs:
1. Request to start the pumps from the outside;
2. "Hold" (if selected);
3. Need for climate control in the absence of an external grid;
4. If selected, the manual starting function of the battery 1.

Upon a request to start the pumps from the outside, the battery 1 must turn on the pumps and start the battery cycle.

Upon the selection of the "hold" function, if the battery voltage 1 drops below the set level, the pumps of the anode and cathode tanks are activated for a predefined time, until the voltage across the terminals of the laminar pack is restored to the nominal value.

If the need for climate control is observed and the energy required for the climate control unit must be supplied by the battery 1, both when it originates from the main battery and when it originates from the auxiliary battery, or if connected to an external grid, from the latter. Therefore, when the internal temperature goes below 3° C. or above 40° C., the pumps are activated in order to supply energy to the system, thus starting the climate control system for the time needed to reach a temperature that complies with the preset ranges, respectively intervening for heating or cooling.

If the manual battery function is selected, the pumps are started and continue to run until shutdown is selected manually.

In order to start the battery 1 it is necessary to perform a preset sequence of operations.

First of all, if there are no active alarms, one proceeds with the checking on the communication line for any request to discharge or charge. In both cases, or if required by manual control, it is necessary to activate both pumps according to an incremental ramp that is equal to 10% per second until 100% of flow-rate (equal for example to 20 liters per minute) is reached. Upon reaching the indicated flow-rate, it is necessary to close the main relay and detect the circulating current, be it positive or negative. As a function of the detected current intensity, it becomes necessary to adjust the pumps so as to ensure a predefined flow-rate (for example equal to 0.17 liters per minute for each Amp of current, but in any case never lower than 5 liters per minute).

If it is necessary to monitor the temperature of the battery 1, the temperatures are monitored by means of two temperature probes located at the output of the laminar pack. If one of the two temperatures approaches a temperature that is close to the upper temperature limit, the system sends along the communication line a corresponding pre-alert message, which prepares the user to set up countermeasures such as reducing the charge current, aimed at stopping the temperature rise gradient.

If the temperature reaches the upper limit, the system opens the power relay and sends a specific alarm signal on the communication line. Such alarm remains active until the temperature drops below the alarm threshold.

For temperature control of the enclosure of the battery 1, one resorts to an internal environmental temperature probe.

There are two set temperature thresholds, the lower threshold and the upper threshold.

If the upper threshold is reached, the system turns on the cooling cycle until the temperature has dropped to a predefined value.

Likewise, if the lower threshold is reached, the system must activate the heating cycle until an additional predefined value is reached.

If it becomes necessary to level the electrolytes because during the operation of the battery 1 a migration of electrolyte from one compartment to the other of the laminar pack occurs, facilitated by the electromotive force of the process, causing a change of levels in the tanks 2 and 3, one resorts to the use of the valve 14.

If the condition occurs in which in a tank 2 the level has reached the maximum and in the other tank 3 has dropped to the minimum, it is necessary to activate the leveling of the tanks 2 and 3.

Figure 8:
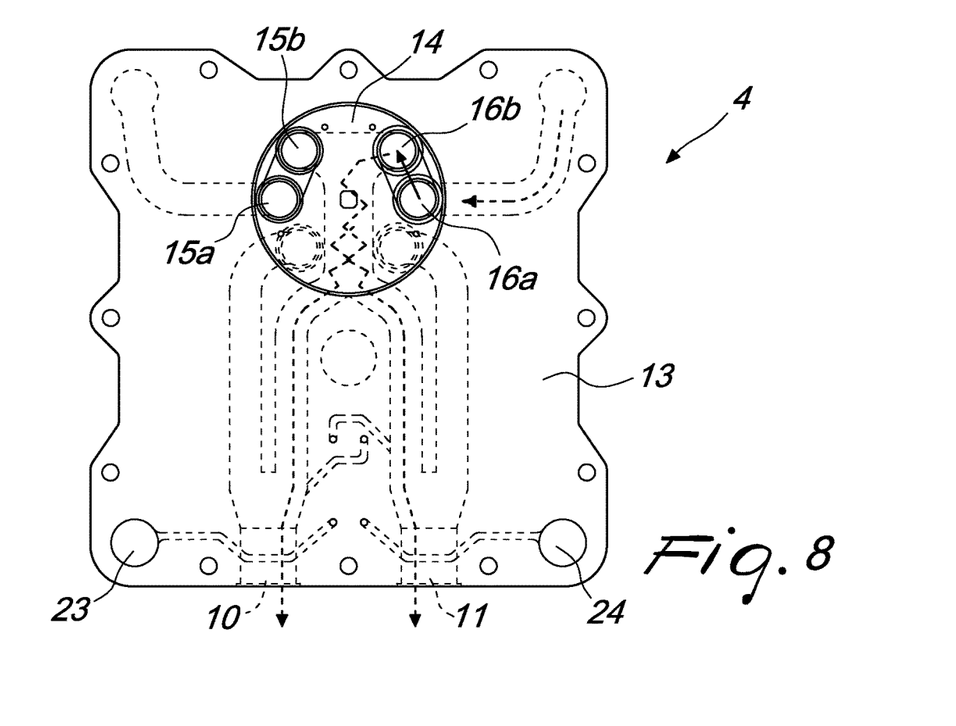
FIG. 8 is a schematic front view of the end plate of FIG. 2 in a third operating configuration.

The battery 1 sends on the communication line a message requiring "leveling", and therefore the operator must discharge the battery deeply until the DOD (depth of discharge) voltage is reached, which might for example have a value equal to 40 V. At this point it is necessary to open the power relay and activate the bypass pump, while the valve is arranged in the configuration shown in FIG. 8, until the levels are restored in both tanks 2 and 3. The fact that only one pump is active entails that only one electrolyte flows within the laminar pack and is divided in output, along the branches 19 and 20, being spread between both tanks 2 and 3. An operation of this type entails the progressive reduction of the level of electrolyte in the tank 2 from which said electrolyte is being drawn with the pump and an increase thereof in the other tank 3, up to correct leveling.

During the operation of the battery 1, in the long period, the imbalance of the levels, although restored by means of a periodic leveling, leads to an imbalance of the concentrations of the species of vanadium that compose it. Therefore it becomes necessary, with a predefined periodic rate, to mix both of the electrolytes so that there is the assurance that on the anode and on the cathode there is an equal quantity of vanadium.

It is evident that mixing brings the state of the battery to a point of non-operation, in which the read voltage is ZERO, since in both compartments the vanadium is at the 3.5 oxidation state. To return to a discharged battery state, where one has $V^{3+}$–$V^{4+}$, there is an energy expenditure equal to half a charge, which is necessary to condition the electrolyte. Only after conditioning is it possible to recharge.

When the system reaches mixing time, it becomes necessary to proceed as follows: sending on the communication line the message that mixing is required, upon which the operator must produce the deep discharge of the battery until the DOD (depth of discharge) voltage of 1 V is reached (the provided value has a merely exemplifying function).

At this point it is possible to open the power relay and activate the mixing command for a predefined time.

Such activation entails the arrangement of the valve 14 in the configuration of FIG. 6.

Once the predefined time period has elapsed, it is necessary to activate the procedure for leveling tanks 2 and 3 in order to force the electrolytes contained therein to be at the same level. Once the leveling process has been completed, the relay can be closed and the reconditioning of the electrolyte can be started until the voltage of the sensing cell (a cell intended to detect electrical parameters and associated with the battery 1) measures a voltage equal to at least 1.1 V (the value given here is merely an example).

Once this reconditioning step has ended, it is possible to start the charging of the battery 2.

If it is instead necessary to check the state of charge of the battery 1, one relies on the measurements of the electrical parameters performed by the sensing cell.

The voltage that coincides with depth of discharge (DOD) is equal to 1 V, while the voltage that coincides with fullness of charge (FOC) is 1.6 V.

The slope between these two limits is an indication of the percentage of energy that is present in the battery 1. The battery 1 can thus display its own charge state on the basis of such measurements, for example providing a percentage value that corresponds thereto on its own display.

The battery 1 is charged by a battery charger that is present in the apparatus in which is connected. The battery 1 merely communicates along the communication line a series of information items that the user utilizes to control the operation and charging in the best possible manner.

The battery 1 can be charged even if the charge state is proximate to 100%; in this case the battery 1 is charged up to fullness of charge (FOC). If instead the battery 1 is at a discharge level at which the voltage of the sensing cell is equal to 1.1 V, the battery 1 reports to the outside the request to charge, such signal remaining present throughout the period of the charge.

The charging cycle, started when the voltage measured by the sensing cell is lower than 1.1 V, is dependent upon the display of a constant-current charge request message. If the voltage detected by the sensing cell reaches the value of 1.6 V, the battery 1 must send a constant-voltage charge request signal. During the constant-voltage charge step, it is possible to consider charging complete when the pumped charging current drops below a preset current value. At this point charging is complete. If, during charging, the voltage exceeds the value of 1.6 V it becomes necessary to open the power relay and send an overload alarm message. 30 seconds after such alarm, it becomes then necessary to check whether the voltage across the sensing cell has a value equal to or greater than 1.6 V, it is possible to reconnect the power relay and restore the preceding state. During the charging step it becomes necessary to monitor the temperatures according to the method described previously.

The battery 1 can also be discharged even if the state of the charge is partial; in this case the battery is discharged to the depth of discharge (DOD) value.

If the measured voltage is comprised between 1.2 V and 1.6 V, the battery 1 is in practice operational. When an energy request signal arrives, it is possible to start the pumps and measure the voltage of the sensing cell. When the measured voltage reaches the minimum threshold of 1.1 V, the battery 1 is discharged (and must be brought to the standby configuration) and a recharge becomes necessary. In the discharge step it is convenient to to keep all the alarm parameters monitored, in addition to verifying constantly the temperatures as described previously.

The end plate 4 eliminates completely the need to associate with the laminar pack of the battery 1 a plurality of hydraulic components and ducts for correct conveyance of the electrolytes. Such plate in fact incorporates all the hydraulic circuits and corresponding control devices needed for the operation of the battery 1, simplifying its structure and accordingly reducing its production costs.

It is furthermore necessary to point out that a battery 1 according to the invention can be placed even in small spaces, thanks to its minimal space occupation allowed by the absence of external hydraulic circuits: it is therefore evident that the battery 1 according to the invention can also be suitable to be installed where the installation of similar batteries of the conventional type is not possible, thus extending enormously the versatility of service of this type of device and not forcing any user to provide adapted spaces for the installation of the battery 1 (such battery can in fact be installed even in areas that are not expressly dedicated, thanks to its structural simplicity and its minimal space occupation).

Advantageously, the present invention solves the problems described earlier, by devising a flow battery 1 that comprises a small number of hydraulic circuits and external pipes and is therefore less expensive than those of the known type and is scarcely subject to failures and malfunctions.

Positively, the flow battery 1 according to the invention ensures that the operations for mixing and leveling the electrolytes are particularly simple, quick and efficient, as described earlier.

Efficiently, the flow battery has low costs and is relatively simple to provide in practice and safe in application.

The invention thus conceived is susceptible of numerous modifications and variations, all of which are within the scope of the appended claims; all the details may further be replaced with other technically equivalent elements.

In the examples of embodiment shown, individual characteristics, given in relation to specific examples, may actually be interchanged with other different characteristics that exist in other examples of embodiment.

In practice, the materials used, as well as the dimensions, may be any according to the requirements and the state of the art.

The disclosures in Italian Patent Application No. BO2013A000327 from which this application claims priority are incorporated herein by reference.

The invention claimed is:

1. A flow battery of a type comprising a first tank for an anode electrolyte, a second tank for a cathode electrolyte, respective hydraulic circuits provided with corresponding pumps for supplying electrolytes to specific planar cells, provided with channels on two mutually opposite faces for the independent conveyance of said electrolytes, mutually separated by electrolytic membranes and electrodes, wherein said planar cells are mutually aligned and arranged side-by-side so as to constitute a laminar pack, on at least one front of said laminar pack there being an end plate provided, on a first face, with at least one channel for the access of the electrolytes that arrive from said laminar pack, with at least one discharge channel for the conveyance of the electrolytes that originate from said access channel to at least one outlet that is connected to a respective tank, and at least one mixing channel that is connected to said at least one outlet, said end plate being provided, on a second face, with a cavity to a bottom of which the at least one said access channel, the at least one said discharge channel and the at least one said mixing channel lead, said cavity accommodating a respective valve provided with at least one duct for the selective connection of said at least one access channel either to the at least one said discharge channel or to the at least one said mixing channel.

2. The flow battery according to claim 1, wherein said cavity has a substantially disk-like shape and is provided, on the bottom, with at least one hole that corresponds to at least one opening selected between a terminal end of said at least one access channel, an initial end of said at least one discharge channel and an initial end of said at least one mixing channel.

3. The flow battery according to claim 2, wherein said valve has a shape and dimensions that are complementary to those of said cavity for sealed rotary accommodation within said cavity, said valve comprising at least one substantially U-shaped duct that has at least one intake passage and at least one exit passage, which face and are proximate to at least one respective opening selected between the terminal end of said at least one access channel, the initial end of said at least one discharge channel and the initial end of said at least one mixing channel, which are present on the bottom of said cavity.

4. The flow battery according to claim 3, wherein said valve can move from a first configuration, in which its intake passages are connected hydraulically to a respective terminal end of said at least one access channel and its exit passages are connected hydraulically to a respective initial end of said at least one discharge channel, to a second configuration, in which its intake passages are connected hydraulically to a respective terminal end of said at least one access channel and its exit passages are connected hydraulically to a respective passage port of said mixing channel.

5. The flow battery according to claim 1, wherein said access channels are two in number and said discharge channels are two in number, said channels being arranged symmetrically with respect to the centerline of said end plate.

6. The flow battery according to claim 1, wherein said mixing channel has an initial end constituted by two passage ports and a terminal bifurcation having branches which lead into the two outlets of said end plate into which said discharge channel also leads.

7. The flow battery according to claim 6, wherein said branches of said mixing channel comprise respective shunts that are open outwardly for coupling to a corresponding sensor, which is external to said laminar pack, for detecting a value selected among electrolyte pressure, differential pressure of the electrolytes in the two branches, flow-rate of the electrolyte, relative flow-rates of the electrolytes in the two branches, temperature of the electrolyte, and differential temperature of the electrolytes in the two branches.

8. The flow battery according to claim 1, wherein said end plate comprises two through channels for introducing the electrolytes in the laminar pack.

9. The flow battery according to claim 8, wherein said through channels comprise respective shunts which are open toward the outside for coupling to a corresponding sensor, which is external to said laminar pack, for detecting a value selected among electrolyte pressure, differential pressure of the electrolytes in the two channels, flow-rate of the electrolyte, relative flow-rate of the electrolytes in the two branches, temperature of the electrolyte, and differential temperature of the electrolytes in the two branches.

10. The flow battery according to claim 1, wherein said laminar pack and said end plate are arranged on the top of an enclosure that contains said first and second tanks, producing a vertical extension of the battery with consequent minimum transverse space occupation.

* * * * *